United States Patent
Drossel et al.

(10) Patent No.: US 8,618,685 B2
(45) Date of Patent: Dec. 31, 2013

(54) METHOD FOR OPERATING A WIND TURBINE IN THE EVENT OF A GRID ERROR AND A WIND TURBINE FOR CARRYING OUT SAID METHOD

(75) Inventors: Detlef Drossel, Norderstedt (DE); Kurt Fischle, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 27 days.

(21) Appl. No.: 13/487,235

(22) Filed: Jun. 3, 2012

(65) Prior Publication Data

US 2012/0306203 A1 Dec. 6, 2012

(30) Foreign Application Priority Data

Jun. 3, 2011 (DE) .......................... 10 2011 105 854

(51) Int. Cl.
*F03D 9/00* (2006.01)
*H02P 9/04* (2006.01)
*F03B 13/00* (2006.01)
*F03B 13/10* (2006.01)

(52) U.S. Cl.
USPC .................... 290/44; 290/43; 290/54; 290/55

(58) Field of Classification Search
USPC .......................................... 290/43, 44, 54, 55
See application file for complete search history.

(56) References Cited

U.S. PATENT DOCUMENTS

| | | | |
|---|---|---|---|
| 4,426,192 A * | 1/1984 | Chertok et al. .................... 416/1 |
| 4,656,362 A * | 4/1987 | Harner et al. .................... 290/44 |
| 5,083,039 A * | 1/1992 | Richardson et al. ............ 290/44 |
| 6,137,187 A * | 10/2000 | Mikhail et al. ................... 290/44 |
| 6,420,795 B1 * | 7/2002 | Mikhail et al. ................... 290/44 |
| 6,566,764 B2 * | 5/2003 | Rebsdorf et al. ................. 290/44 |
| 6,600,240 B2 * | 7/2003 | Mikhail et al. ................... 307/85 |
| 6,847,128 B2 * | 1/2005 | Mikhail et al. ................... 290/44 |
| 6,856,039 B2 * | 2/2005 | Mikhail et al. ................... 290/44 |
| 6,856,040 B2 * | 2/2005 | Feddersen et al. .............. 290/44 |
| 6,921,985 B2 | 7/2005 | Janssen et al. ................... 290/44 |
| 6,933,625 B2 * | 8/2005 | Feddersen et al. .............. 290/44 |
| 7,042,110 B2 * | 5/2006 | Mikhail et al. ................... 290/44 |
| 7,095,131 B2 * | 8/2006 | Mikhail et al. ................... 290/44 |
| 7,425,771 B2 * | 9/2008 | Rivas et al. ....................... 290/44 |
| 7,528,496 B2 * | 5/2009 | Fortmann ......................... 290/44 |
| 7,714,458 B2 | 5/2010 | Harms et al. ..................... 290/44 |
| 7,834,472 B2 | 11/2010 | Rebsdorf et al. ................. 290/44 |
| 7,851,934 B2 | 12/2010 | Nyborg ............................ 290/44 |
| 7,966,103 B2 | 6/2011 | Jorgensen et al. ............ 700/297 |
| 8,116,914 B2 * | 2/2012 | Oohara et al. ................ 700/287 |
| 8,183,704 B2 * | 5/2012 | Rivas et al. ....................... 290/44 |
| 8,198,742 B2 * | 6/2012 | Jorgensen et al. .............. 290/44 |
| 8,207,623 B2 * | 6/2012 | Rivas et al. ....................... 290/44 |

(Continued)

*Primary Examiner* — Pedro J Cuevas
(74) *Attorney, Agent, or Firm* — Walter Ottesen P.A.

(57) ABSTRACT

The invention is directed to a method for operating a wind turbine in the event of a grid error. The wind turbine has a rotor having a rotor blade adjustable in its blade pitch angle, a generator and a unit for capturing an actual value of the rotational speed of the generator, a value of the blade pitch angle and an actual value of a variable which is representative of a generator torque. The method includes recognizing a grid error; capturing the actual value of the generator torque and actual value of rotational speed of the generator when a grid error was recognized; determining a change in torque; capturing the pitch angle; determining a corrective value for the pitch angle in dependence upon the change in the generator torque and the value for the pitch angle; and, determining a corrected set-point for the pitch angle.

14 Claims, 4 Drawing Sheets

(56) References Cited

U.S. PATENT DOCUMENTS

| | | | |
|---|---|---|---|
| 8,264,094 B2 * | 9/2012 | Rivas et al. | 290/44 |
| 8,294,288 B2 * | 10/2012 | Rivas et al. | 290/44 |
| 2002/0105189 A1 * | 8/2002 | Mikhail et al. | 290/44 |
| 2004/0094964 A1 * | 5/2004 | Mikhail et al. | 290/44 |
| 2004/0207208 A1 * | 10/2004 | Mikhail et al. | 290/44 |
| 2005/0012339 A1 * | 1/2005 | Mikhail et al. | 290/44 |
| 2005/0253396 A1 * | 11/2005 | Mikhail et al. | 290/44 |
| 2007/0085343 A1 * | 4/2007 | Fortmann | 290/44 |
| 2008/0069692 A1 * | 3/2008 | Oohara et al. | 416/31 |
| 2008/0277938 A1 | 11/2008 | Oohara et al. | 290/44 |
| 2008/0296898 A1 * | 12/2008 | Ichinose et al. | 290/44 |
| 2009/0206606 A1 | 8/2009 | Jorgensen et al. | 290/44 |
| 2010/0025995 A1 * | 2/2010 | Lang et al. | 290/44 |
| 2011/0057443 A1 * | 3/2011 | Rivas et al. | 290/44 |

* cited by examiner

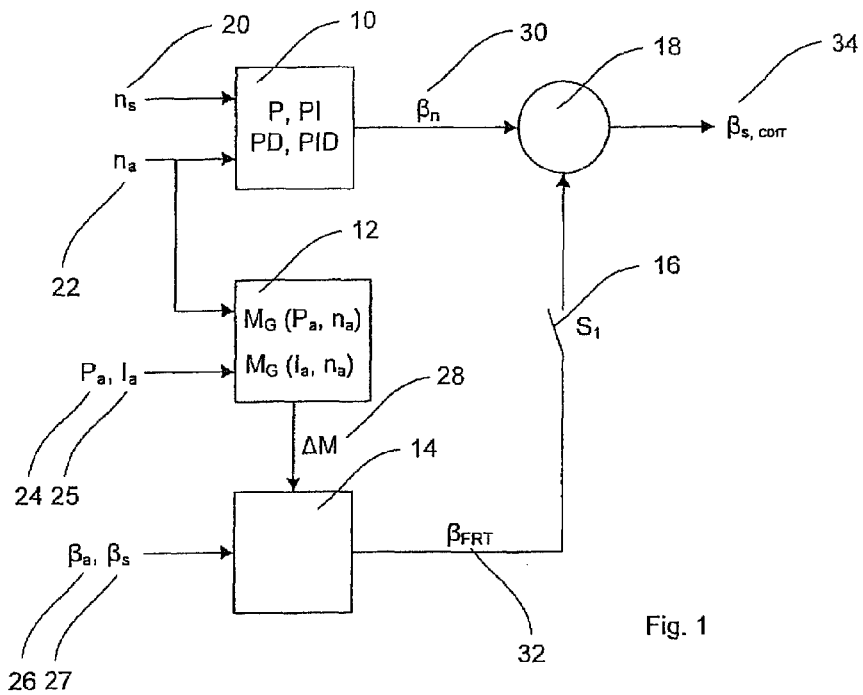
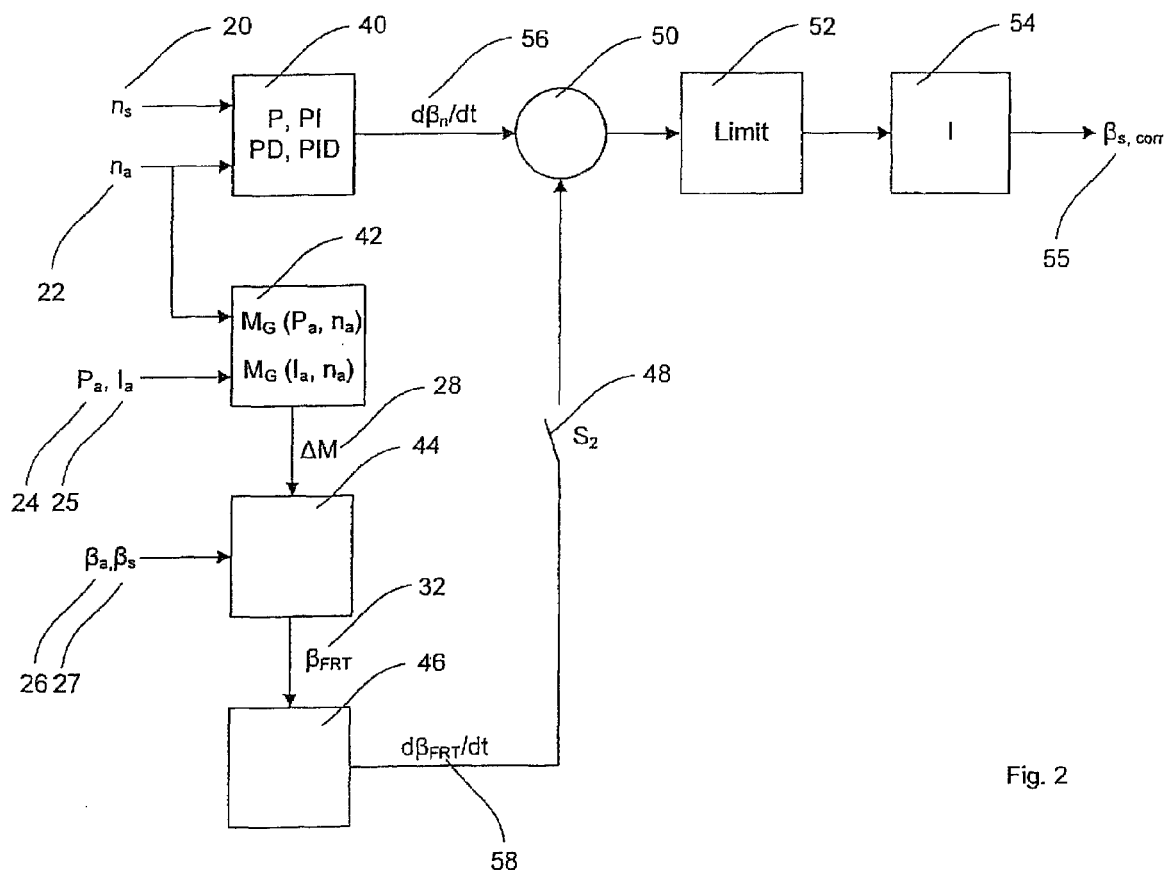
Fig. 1
Fig. 2

METHOD FOR OPERATING A WIND TURBINE IN THE EVENT OF A GRID ERROR AND A WIND TURBINE FOR CARRYING OUT SAID METHOD

CROSS REFERENCE TO RELATED APPLICATION

This application claims priority of German patent application no. 10 2011 105 854.4, filed Jun. 3, 2011, the entire content of which is incorporated herein by reference.

FIELD OF THE INVENTION

The present invention relates to a method for operating a wind turbine in the event of an occurrence of a grid error, the wind turbine having a rotor having at least one rotor blade which can be adjusted in its blade pitch angle, a generator connected to the rotor for the generation of an electrical power and at least one unit for capturing an actual value of the rotational speed of the generator, a value for the blade pitch angle and an actual value of a variable which is representative of a generator torque, in particular an active power and/or active current. The invention also relates to a wind turbine for the performance of the method.

BACKGROUND OF THE INVENTION

In the case of unexpected grid errors, the wind turbine can no longer feed the maximum power into the electrical grid. The quick drop in power resulting therefrom leads to a rotational speed increase which is correspondingly reacted to by a control of the blade pitch angle. As a result, fluctuations in the rotational speed can occur.

U.S. Pat. No. 7,966,103 discloses a method for operating a wind turbine at a low grid voltage. In the event of a grid error when there is low grid voltage present, the pitch angle at the current power is determined based on the tip speed ratio prior to the occurrence of the grid error. A control for the blade pitch angle is triggered in order to hold the electricity generated constant during the grid error.

U.S. Pat. No. 6,921,985 B2 discloses a method for operating a wind turbine in the event of a grid error in which an uninterrupted power supply for the blade pitch angle control is provided. The uninterrupted power supply here falls back on the intermediate circuit between the grid-side converter and the rotor-side converter. With the switch to the uninterrupted power supply, the blade pitch angle control is activated by the control of the wind turbine in order to correspondingly adjust the blade angle in reaction to the switch process.

U.S. Pat. No. 7,834,472 discloses a method for controlling a wind turbine in the event of a grid error. In the event of a grid error, an operating parameter of the wind turbine, for example the temperature, is captured and the blade angle control is triggered in order to keep the temperature within a predetermined interval.

U.S. Pat. No. 7,851,934 discloses a method for controlling a wind turbine in the event of a grid error, in which method, during a grid error, the blade angle is increased until the rotor no longer accelerates. The control of the rotational speed which is typical during normal operation is not performed during a grid error. The increase in the blade angle is triggered when the active power output by the wind turbine is 125% of the nominal active power.

U.S. Pat. No. 7,714,458 discloses a method for operating a wind turbine in the event of a grid error, in which method a setting of the blade pitch angle is already initiated before the increase in the rotor rotational speed, the rotor rotational speed or generator rotational speed being adjusted to a set-point rotational speed which results from an electrical variable and the current wind speed present in the event of a grid error.

SUMMARY OF THE INVENTION

It is an object of the invention to provide a method and a wind turbine with which a quick load reduction to a new stable operating point without grid separation is possible after a grid error.

The method according to the invention serves for the operation of a wind turbine in the event of the occurrence of a grid error. The wind turbine has a rotor having at least one rotor blade which can be adjusted in its blade pitch angle, a generator connected to the rotor for the generation of electrical power as well as at least one unit for capturing an actual value of the rotational speed of the generator, a value of the blade pitch angle and an actual value of a variable representative of a generator torque, in particular an active power and/or an active current. The unit for capturing the generator rotational speed must not necessarily measure the rotational speed of the generator but can also measure a different rotational speed in the drive train and convert that into a rotational speed of the generator. In the method according to the invention, a recognition of a grid error takes place. Further, a capturing of the active power and/or the active current and the rotational speed takes place when a grid error was recognized. In a further step, a change in the generator torque is determined on the basis of the captured active power and/or the captured active current and the captured rotational speed. In the event of a grid error, the change in the generator torque is an especially critical value. In a further step, a corrective value for the blade pitch angle is determined in dependence upon the change in generator torque. A corrected set-point for the blade pitch angle is determined from the corrective value for the blade pitch angle and a rotational speed-dependent set-point for the blade pitch angle. The rotational speed-dependent set-point for the blade pitch angle is the set-point which during regular operation is determined in dependence upon an actual value and a set-point of the rotational speed. The method according to the invention has a number of advantages. One advantage is the continued use of the rotational speed-dependent set-point and in that manner a change in wind speed can be reacted to. Only a corrective value to the rotational speed-dependent set-point is determined. Further, the method of the invention reacts very quickly to the occurring grid error because it is already initiated when the grid error is recognized. Through the quick implementation of the method according to the invention, the blade pitch control can already react to torque changes which result following a grid error.

In a preferred embodiment, the recognition of the grid error takes place in dependence upon the change in a grid voltage and/or a grid frequency. In the process, it can be provided that when a predetermined threshold value of the grid voltage and/or of the grid frequency is undershot or exceeded, a grid error is recognized. For example, the grid error is recognized when the grid voltage drops by more than a predetermined value relative to the nominal voltage.

In a further preferred embodiment of the method according to the invention, the recognition of the grid error takes place in dependence upon an error message which is generated in a converter and/or the generator of the wind turbine. Causes for such an error message can, for example, be the situation of a temperature or current being exceeded.

The captured value of the blade pitch angle can be a measured actual value. Alternatively or additionally, the captured value of the blade pitch angle can be a set-point for the blade pitch angle, which, for example, is present in a control for the blade pitch angle and is captured therefrom.

In an especially preferred embodiment of the method according to the invention, a capturing of an actual value or set-point for the blade pitch angle takes place. In the process, in determining the corrective value for the blade pitch angle in dependence upon the change in generator torque, the actual value or the set-point for the blade pitch angle are additionally considered. This embodiment of the invention is based on the knowledge that, in dependence upon the actual value or set-point for the blade pitch angle of the wind turbine, the torque received by the rotor blade varies corresponding to a non-linear relationship with a change in the blade pitch angle. In particular at small blade pitch angles, a change in the blade pitch angle effects a smaller change in the torque than at large blade pitch angles.

In a preferred embodiment, the corrective value for the blade pitch angle is limited in such a manner that a maximum rate of change for the blade pitch angle is not exceeded. In this manner it can be ensured that the control for the blade pitch angle is not overmodulated or set-points are specified which can only be achieved with a substantial delay by the control.

In a further preferred embodiment, the rotational speed-dependent set-point for the blade pitch angle is controlled in dependence upon the rotational speed as during regular operation. This enables the rotational speed-dependent control of the blade pitch angle to continue even in the event of a grid error and makes the control easier at the conclusion of the grid error.

In a preferred embodiment of the method according to the invention, the corrective value for the blade pitch angle is applied by closing a switch after the recognition of the grid error. The switch can be realized as hardware or as software. As a result, the corrective value can make a contribution to the set-point for the blade pitch angle immediately after the start of the grid error.

The object of the invention is also achieved by a wind turbine which has a rotor having at least one rotor blade which can be adjusted in its blade pitch angle as well as a blade pitch control which determines a rotational speed-dependent set-point for setting the blade pitch angle for at least one rotor blade. The wind turbine further has a generator connected to the rotor which generates an electrical power for an electrical supply grid. According to the invention, a control is provided which in response to a grid error determines a change in the generator torque and transmits a corrective value for the blade pitch angle, which is dependent on the change in the generator torque and a value of the blade pitch angle, to the blade pitch control, wherein the blade pitch control sets the blade pitch angle corresponding to a corrected set-point which is determined from the rotational speed-dependent set-point for the blade pitch angle and the corrective value for the blade pitch angle. In the wind turbine according to the invention, a control is provided which responds to a grid error and generates a corrective value for the blade pitch angle. The corrective value for the blade pitch angle is added to a rotational speed-dependent set-point for the blade pitch angle in order to obtain a corrected set-point for the blade pitch angle which can be set via a blade pitch control. Because the corrective value for the blade pitch angle is generated directly in response to the grid error, the wind turbine according to the invention can react quickly and reliably to the grid error.

In a preferred embodiment, the corrective value for the blade pitch angle is limited in such a manner that a maximum rate of change for the blade pitch angle is not exceeded.

BRIEF DESCRIPTION OF THE DRAWINGS

The invention will now be described with reference to the drawings wherein:

FIG. 1 is a block diagram of a controller structure for determining a corrected set-point for the blade pitch angle;

FIG. 2 is a block diagram of an alternative controller structure for determining a corrected set-point for the blade pitch angle;

DESCRIPTION OF THE PREFERRED EMBODIMENTS OF THE INVENTION

Figure 3:
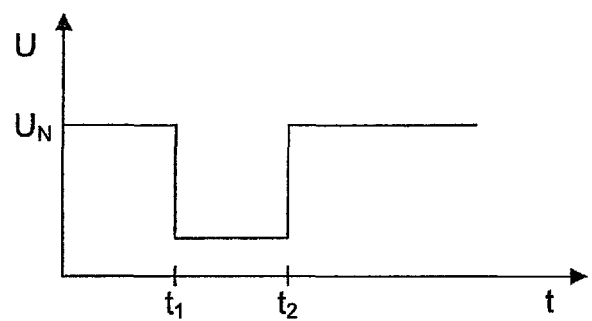
FIG. 3 shows a course of the voltage over time in the event of a grid error.

FIG. 1 in a schematic view shows a controller structure for determining a corrected set-point for a blade pitch angle $\beta_{s,corr}$ 34. The set-point for the rotational speed $n_s$ 20 and the actual value of the rotational speed $n_a$ 22 are applied to the controller structure as input values. Further, the actual value of the active power $P_a$ 24 or of the active current $I_a$ 25 and the actual value or the set-point of the blade pitch angle $\beta_a, \beta_s$ 26, 27 are processed.

The set-point for the rotational speed $n_s$ 20 and the actual value for the rotational speed $n_a$ 22 are applied to the controller 10. The controller 10 can have different configurations wherein a proportional element P is provided in every configuration. Furthermore, in dependence upon the selected configuration of the controller 10, an integral element 1 or a differential element D or both can additionally be provided. The controller 10 provides a suggested value for the blade pitch angle $\beta_n$ 30 as a result. When the switch S1 16 is opened, the suggested value for the blade pitch angle $\beta_n$ 30 is transmitted on to subsequent adjusting drives (not shown) for the blade pitch angle as the set-point for the blade pitch angle $\beta_{s,corr}$ 34 without the addition of a further blade pitch angle in the addition element 18.

Additionally, in the controller structure shown in FIG. 1, it is provided that in step 12 a generator torque $M_G$ is calculated from the actual value of the active power $P_a$ 24 and the actual value of the rotational speed $n_a$ 22. Alternatively, the generator torque $M_G$ can also be calculated from an actual value of a current $I_a$, for example an active current. The calculation of the generator torque $M_G$ here is performed via the relationship:

$$M_G = \frac{P_a \cdot 60}{2\pi \cdot n_a}$$

The generator torque $M_G$ determined in this manner is continuously calculated and the change in the generator torque $\Delta M$ 28 over time, dependent upon the actual value or set-point for the blade pitch angle $\beta_a, \beta_s$ 26, 27, is converted into an additional set-point for the blade pitch angle in the event of a grid error $\beta_{FRT}$32. In the method step 14, in dependence upon the change in the generator torque ΔM 28, an amplification of the actual value or set-point for the blade pitch angle $\beta_a,\beta_s$26,27 takes place, in order to determine the additional set-point for the blade pitch angle in the event of a grid error $\beta_{FRT}$32. In particular, the grid error can be recognized with the occurrence of a value of ΔM which is not zero. Alternatively, it is also possible to recognize a grid error through a measurement of the grid voltage. In the event of a grid error, the switch S1 16 is closed, so that the corrected set-point for the blade pitch angle $\beta_{s,corr}$34 results as the sum of the suggested value for the blade pitch angle $\beta_n$30 and the additional set-point for the blade pitch angle in the event of a grid error $\beta_{FRT}$32.

FIG. 2 shows an alternative controller structure in which neither a suggested value for the blade pitch angle $\beta_n$30 nor an additional set-point for the blade pitch angle $\beta_{FRT}$32 is determined, but rather the time derivatives of these values are processed in the controller structure. The advantage of processing the time derivatives of these values in the controller structure lies in that speed limits can, thereby, be defined especially easily, so that set-points for the blade pitch angle consider a maximum adjusting speed for the blade pitch angle at the rotor blade. In the alternative controller structure according to FIG. 2, a set-point for the rotational speed $n_s$20 and an actual value for the rotational speed $n_a$22 are applied to a controller 40. The controller 40 can, again, be configured as a controller having a proportional element P, wherein an integrating element I and/or a differentiating element D can be additionally provided. Unlike the embodiment of FIG. 1, the output value of the controller 40 is viewed and processed as a time derivative of a suggested value for the blade pitch angle $d\beta_n/dt$56.

As was already the case with the controller structure of FIG. 1, the time derivative of the suggested value for the blade pitch angle $d\beta_n/dt$56 is transmitted on to a limiting element 52 via the addition element 50 in the event that there is no grid error present and thus the switch 48 is open. The limiting element 52 limits the time derivative of the suggested value for the blade pitch angle $d\beta_n/dt$56 to a permissible maximum value for the adjusting speed which can be achieved by the adjusting drives for the blade pitch angle. The thusly limited time derivative is integrated with respect to time in a subsequent step 54, so that a corrected set-point for the blade pitch angle $\beta_{s,corr}$55 forms the output value of the controller structure according to FIG. 2.

In a method step 42, as described above, the generator torque $M_G$ of the wind turbine is calculated and its change over time ΔM 28 is determined from the applied actual value for the rotational speed $n_a$22 and the actual value for the active power $P_a$24. Alternatively, the generator torque $M_G$ can also be calculated from the actual value of a current $I_a$, for example an active current. In dependence upon the change in the generator torque ΔM 28 over time, the actual value or set-point for the blade pitch angle $\beta_a,\beta_s$26,27 is amplified in method step 44 in order to obtain the additional set-point for the blade pitch angle when a grid error is present $\beta_{FRT}$32. Essentially, the method step 44 of FIG. 2 corresponds to method step 14 of FIG. 1. In the subsequent method step 46, the additional set-point for the blade pitch angle when a grid error is present $\beta_{FRT}$32 is differentiated, so that the time derivative of the additional set-point for the blade pitch angle when a grid error is present $d\beta_{FRT}/dt$58 is applied to the switch 48. If a grid error is recognized in method step 42 through the change in the generator torque ΔM 28 or a grid error is recognized as a result of other reasons, the switch S2 48 is closed and the time derivatives of the suggested value for the blade pitch angle $d\beta_n/dt$56 and of the additional set-point for the blade pitch angle when a grid error is present $d\beta_{FRT}/dt$58 are added up in step 50. In a subsequent step 52, the limiting of the sum formed from the time derivatives to the maximum adjusting speed of the adjusting drives for the blade pitch angle takes place. In order to provide a set-point for the control of the adjusting drives, the value limited in step 52 is integrated in the subsequent integrator 54 and the corrected set-point for the blade pitch angle $\beta_{s,corr}$55 is outputted. Because of the time derivative of the blade pitch angle, which was calculated from a steep drop in power or torque, the time derivative can be present in the form of a short impulse which only effects a short-term adjustment of the blade pitch angle. Through step 52 and the control of the adjusting drives for the blade pitch angle it can be ensured that the resulting intended angle is really adjusted.

The particular advantage of the controller structures of FIGS. 1 and 2 is that, in the event of a fault as a result of closing the switch S1 16 or S2 48, the corresponding correction values 32, 58 can be applied while the other determination of the set-point continues. If the fault persists for, for example, 3 seconds, then the switch S1 16 or S2 48 also remains closed for a predetermined time beyond the fault.

FIG. 3 shows a course over time of the grid voltage U over time t when a grid error occurs. At time $t_1$ a voltage drop occurs which lasts until time $t_2$. Subsequently, the nominal voltage $U_N$ is again present in the grid.

Figure 4:
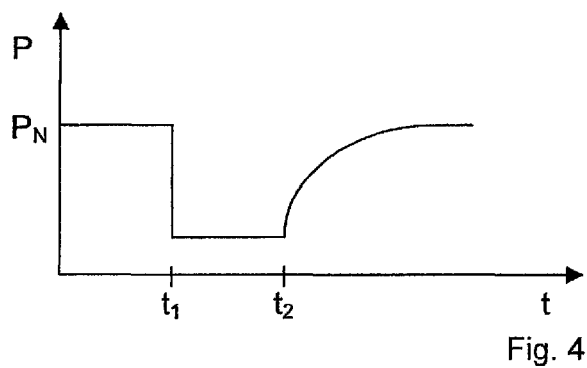
FIG. 4 shows a course of the active power over time in the event of a grid error.

FIG. 4 shows a course of the active power P supplied by the wind turbine over time t, which drops at $t_1$ as a result of the dropping grid voltage U and increases again to the nominal power $P_N$ with the return of grid voltage U starting from $t_2$.

Figure 5:
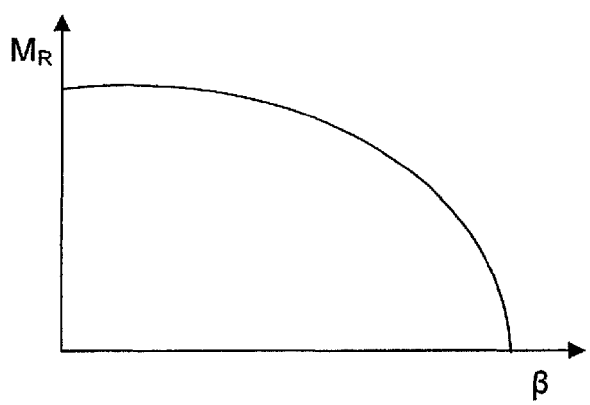
FIG. 5 shows the relationship between the torque and blade pitch angle.

FIG. 5 shows the technical problems which were the basis of the invention. FIG. 5 shows a rotor blade curve at nominal wind at which the torque of the rotor blade $M_R$ is applied via the blade pitch angle β. In the region of low β values, it can be clearly seen that the change in the torque $\Delta M_R$ is only slightly dependent upon a change in the blade pitch angle Δβ. If, in the event of a grid error, an attempt is made to control the torque of the wind turbine with a conventional controller for the blade pitch angle, then this control is very insensitive. In the method according to the invention, corresponding to FIG. 2, the conversion of the torque M into a correction value $\beta_{sFRT}$36 through an amplification 32 which is dependent upon $\beta_a$26 results in the correction value for lower values of β being greater than for higher β values because the torque of the rotor blade $M_R$ is less sensitive to a change in β in the region of lower values of β.

Figure 6:
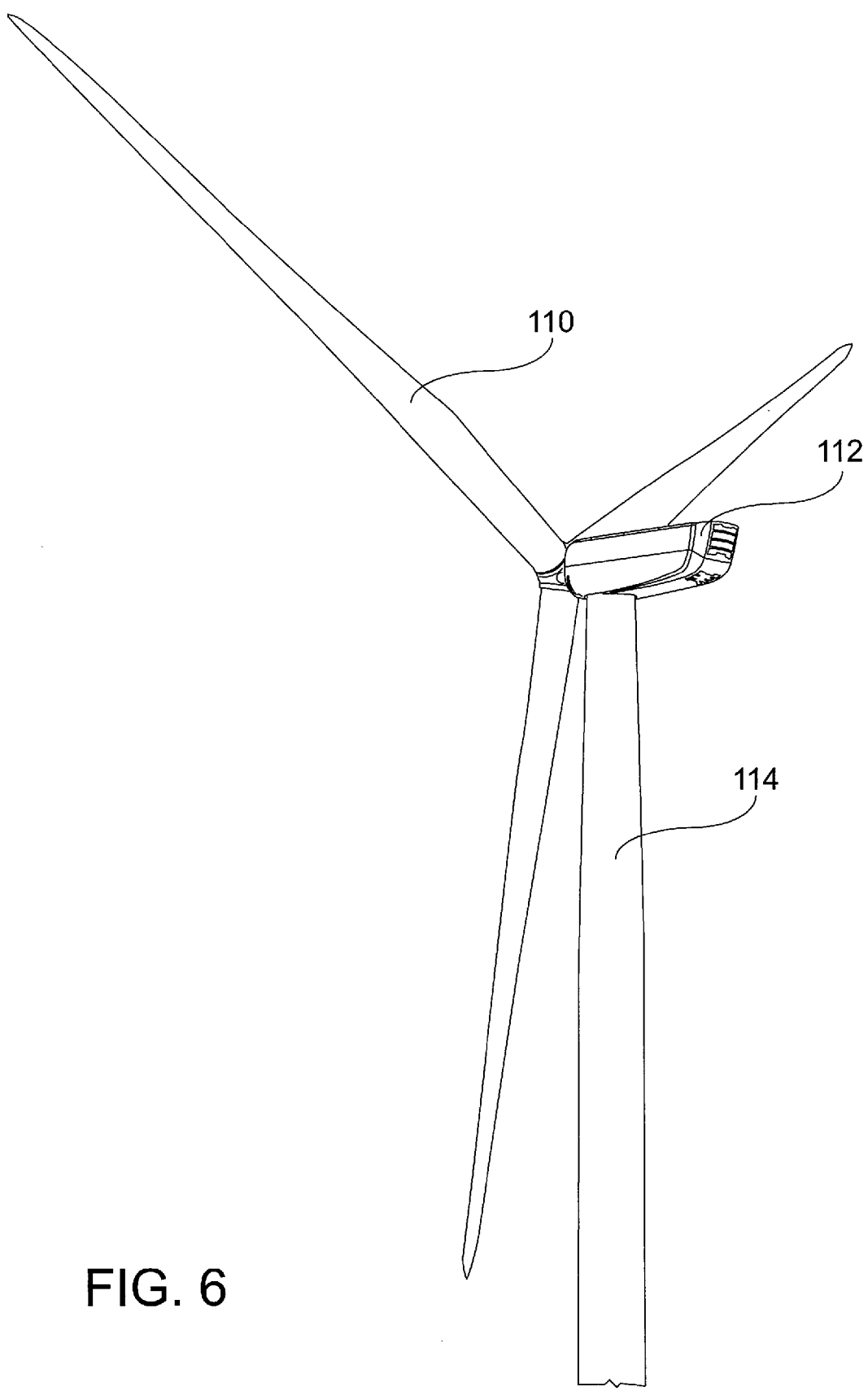
FIG. 6 is a schematic of a wind turbine having three rotor blades.

FIG. 6 shows a wind turbine having three rotor blades 110, a nacelle 112 and a tower 114.

Figure 7:
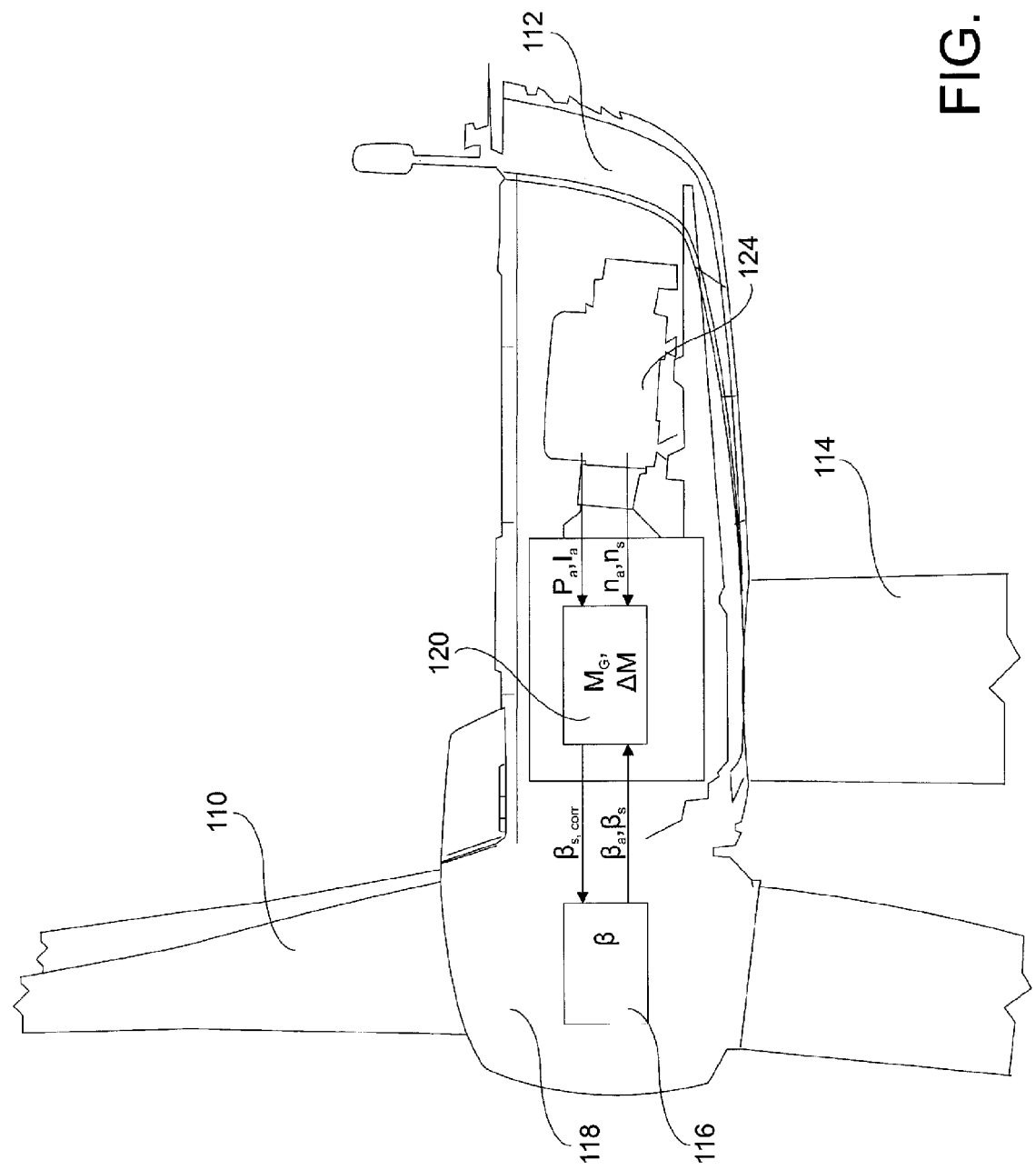
FIG. 7 is a schematic of the nacelle of the wind turbine shown in FIG. 6.

FIG. 7 shows a schematic view of the nacelle 112 with a rotor hub 118. The wind turbine includes: a rotor having at least one rotor blade 110 configured to be adjustable in blade pitch angle; a blade pitch control 116 configured to determine a rotational speed-dependent set-point for setting the blade pitch angle for the rotor blade 110; a generator 124 connected to the rotor and configured to generate electrical power for an electrical supply grid and to develop a generator torque; a control unit 120 configured to determine a change in the generator torque in response to a grid error and transmit a corrective value for the blade pitch angle in dependence upon the change in the generator torque and a value for the blade pitch angle to the blade pitch control 116; and, the blade pitch control 116 being configured to set the blade pitch angle in correspondence to a corrected set-point which results from the rotational speed-dependent set-point for the blade pitch angle for regular operation and the corrective value for the blade pitch angle.

It is understood that the foregoing description is that of the preferred embodiments of the invention and that various changes and modifications may be made thereto without departing from the spirit and scope of the invention as defined in the appended claims.

What is claimed is:

1. A method for operating a wind turbine in the event of a grid error, wherein the wind turbine has a rotor having at least one rotor blade which can be adjusted in its blade pitch angle, a generator connected to the rotor for the generation of electrical power (P) and at least one unit for capturing an actual value of the rotational speed of the generator ($n_a$), a value for the blade pitch angle ($\beta_a$, $\beta_s$) and an actual value of a variable which is representative of a generator torque ($M_G$), said method comprising the steps of:
recognizing a grid error;
capturing an actual value of the variable representative of the generator torque ($M_G$) and the actual value of the rotational speed of the generator ($n_s$) when a grid error is recognized;
determining a change in the generator torque ($\Delta M_G$);
capturing the value for the blade pitch angle $\beta_a$, $\beta_s$);
determining a corrective value for the blade pitch angle in dependence upon the change of the generator torque ($\Delta M_G$) and the value for the blade pitch angle ($\beta_a$, $\beta_s$); and,
determining a corrected set-point for the blade pitch angle which results from a rotational speed dependent set-point for the blade pitch angle during a regular operation and the determined corrective value for the blade pitch angle.

2. The method of claim 1, wherein the actual value of a variable representative of the generator torque ($M_G$) is one of an actual value of a generated active power ($P_a$) and of an active current ($I_a$).

3. The method of claim 1, wherein the recognition of the grid error takes place in dependence upon at least one of a change in a grid voltage ($\Delta U$), a change in a grid frequency ($\Delta f$), an error message of a converter, and an error message of the generator.

4. The method of claim 1, wherein the recognition of the grid error takes place in dependence upon an error message which is generated in at least one of a converter and the generator.

5. The method according to claim 1, wherein an actual value of the blade pitch angle is captured.

6. The method of claim 1, wherein a set-point of the blade pitch angle is captured.

7. The method of claim 1, wherein:
one of the actual value and the set-point for the blade pitch angle is captured; and,
said corrective value for the blade pitch angle is determined in dependence upon the change in generator torque ($\Delta M_G$) and one of said actual value of said blade pitch angle ($\beta_a$, $\beta_s$) and said set-point for the blade pitch angle ($\beta_a$, $\beta_s$).

8. The method of claim 1, wherein the corrective value for the blade pitch angle is determined as an angle ($\beta_{FRT}$).

9. The method of claim 1, wherein the corrective value for the blade pitch angle is determined as a rate of change of an angle ($d\beta_{FRT}/dt$).

10. The method of claim 1, wherein the corrective value for the blade pitch angle is limited in such a manner that a maximum rate of change for the blade pitch angle is not exceeded.

11. The method of claim 1, wherein the rotational speed dependent set-point for the blade pitch angle is controlled in dependence upon an actual value and a set-point of the rotational speed in a regular operation.

12. The method of claim 1, wherein the corrective value for the blade pitch angle is applied after the recognition of a grid error.

13. A wind turbine comprising:
a rotor having at least one rotor blade configured to be adjustable in a blade pitch angle;
a blade pitch control configured to determine a rotational speed-dependent set-point for setting said blade pitch angle for said rotor blade;
a generator connected to said rotor and configured to generate electrical power for an electrical supply grid and to develop a generator torque;
a control unit configured to determine a change in the generator torque in response to a grid error and transmit a corrective value for the blade pitch angle in dependence upon said change in said generator torque and a value for said blade pitch angle to said blade pitch control; and,
said blade pitch control being configured to set said blade pitch angle in correspondence to a corrected set-point which results from said rotational speed-dependent set-point for said blade pitch angle for regular operation and said corrective value for said blade pitch angle.

14. The wind turbine of claim 13, wherein said corrective value for said blade pitch angle is limited in such a manner that a maximum rate of change for said blade pitch angle is not exceeded.

* * * * *

UNITED STATES PATENT AND TRADEMARK OFFICE
CERTIFICATE OF CORRECTION

| | | |
|---|---|---|
| PATENT NO. | : 8,618,685 B2 | Page 1 of 1 |
| APPLICATION NO. | : 13/487235 | |
| DATED | : December 31, 2013 | |
| INVENTOR(S) | : Drossel et al. | |

It is certified that error appears in the above-identified patent and that said Letters Patent is hereby corrected as shown below:

In the Specification

In Column 4:
Line 42: delete "element 1" and insert -- element I -- therefor.

In the Claims

In Column 7:
Claim 1, Line 26: delete "angle $\beta_a$, $\beta_s$);" and insert -- angle ($\beta_a$, $\beta_s$); -- therefor.

Signed and Sealed this
Twenty-seventh Day of May, 2014

Michelle K. Lee
*Deputy Director of the United States Patent and Trademark Office*